US008856293B1

(12) United States Patent
Sadry (10) Patent No.: US 8,856,293 B1
(45) Date of Patent: Oct. 7, 2014

(54) METHODS AND DEVICES FOR NAS-LEVEL DATA PROTECTION BASED ON NAS CONFIGURATION IMAGES

(75) Inventor: Nauzad Sadry, Irvine, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 106 days.

(21) Appl. No.: 13/408,999

(22) Filed: Feb. 29, 2012

(51) Int. Cl.
*G06F 15/16* (2006.01)

(52) U.S. Cl.
USPC ............ 709/221; 709/211; 709/215; 709/223; 709/224; 709/225; 709/226; 709/229; 709/232; 711/170; 711/171; 711/172; 711/173

(58) Field of Classification Search
USPC ......... 709/221, 211, 215, 223–226, 229, 232; 712/15; 713/100; 711/170–173
See application file for complete search history.

(56) References Cited

U.S. PATENT DOCUMENTS

| 7,240,122 B2 | 7/2007 | Sato |
| 7,424,547 B2 | 9/2008 | Sato |
| 7,668,882 B2 | 2/2010 | Nakatani et al. |
| 7,949,635 B1 | 5/2011 | Korshunov et al. |
| 8,285,965 B2* | 10/2012 | Karr et al. ...................... 711/173 |
| 2005/0055402 A1 | 3/2005 | Sato |
| 2006/0129654 A1 | 6/2006 | Sato |
| 2007/0073782 A1 | 3/2007 | Nakatani et al. |
| 2008/0016311 A1* | 1/2008 | Harada .......................... 711/170 |
| 2008/0126446 A1 | 5/2008 | Brunet et al. |
| 2009/0037560 A1* | 2/2009 | Hanes et al. ................... 709/220 |
| 2009/0089862 A1 | 4/2009 | Sun |
| 2009/0164608 A1* | 6/2009 | Komaki ......................... 709/220 |
| 2009/0300081 A1 | 12/2009 | Ueoka |
| 2010/0115008 A1* | 5/2010 | Nakatani et al. .............. 707/823 |
| 2010/0293148 A1* | 11/2010 | Cesario et al. ................ 707/652 |
| 2011/0016093 A1 | 1/2011 | Clark |
| 2011/0167044 A1* | 7/2011 | Hiwatashi et al. ............ 707/652 |
| 2012/0102011 A1* | 4/2012 | Matsuki et al. ............... 707/705 |
| 2014/0082508 A1* | 3/2014 | Rajashekar et al. .......... 715/739 |

* cited by examiner

*Primary Examiner* — Farid Homayounmehr
*Assistant Examiner* — Lizbeth Torres-Diaz (57) ABSTRACT

A network-attached storage (NAS) device comprises an operational state comprising first system settings; a network interface configured to couple to a network and a processor coupled to the network interface. The processor may be configured to identify a NAS configuration image stored on an externally accessible storage device, the NAS configuration image comprising second system settings created from an other NAS device on the network; determine that the NAS configuration image is compatible with the NAS device; receive a copy of the NAS configuration image; compare the second system settings with the first system settings to identify compatible system settings, and modify the first system settings based on the compatible system settings.

23 Claims, 12 Drawing Sheets

METHODS AND DEVICES FOR NAS-LEVEL DATA PROTECTION BASED ON NAS CONFIGURATION IMAGES

BACKGROUND

Online remote backup utilities exist that manage the remote backup of selected files and directories. Such backup utilities include, for example, "Time Machine" by Apple, Inc. (creates incremental backups of files that can be selectively restored at a later date), "CrashPlan" by codefortytwo software (continuously sends encrypted data to online cloud storage), "Carbonite" (online remote backup), "Dropbox" (folder synchronized across connected devices), and "Mozy" (online remote backup and synchronized folder). However, such backup utilities are not configured for Network Attached Devices (NAS) and do not enable a NAS device to migrate from a first state to a second state.

DETAILED DESCRIPTION

Figure 1:
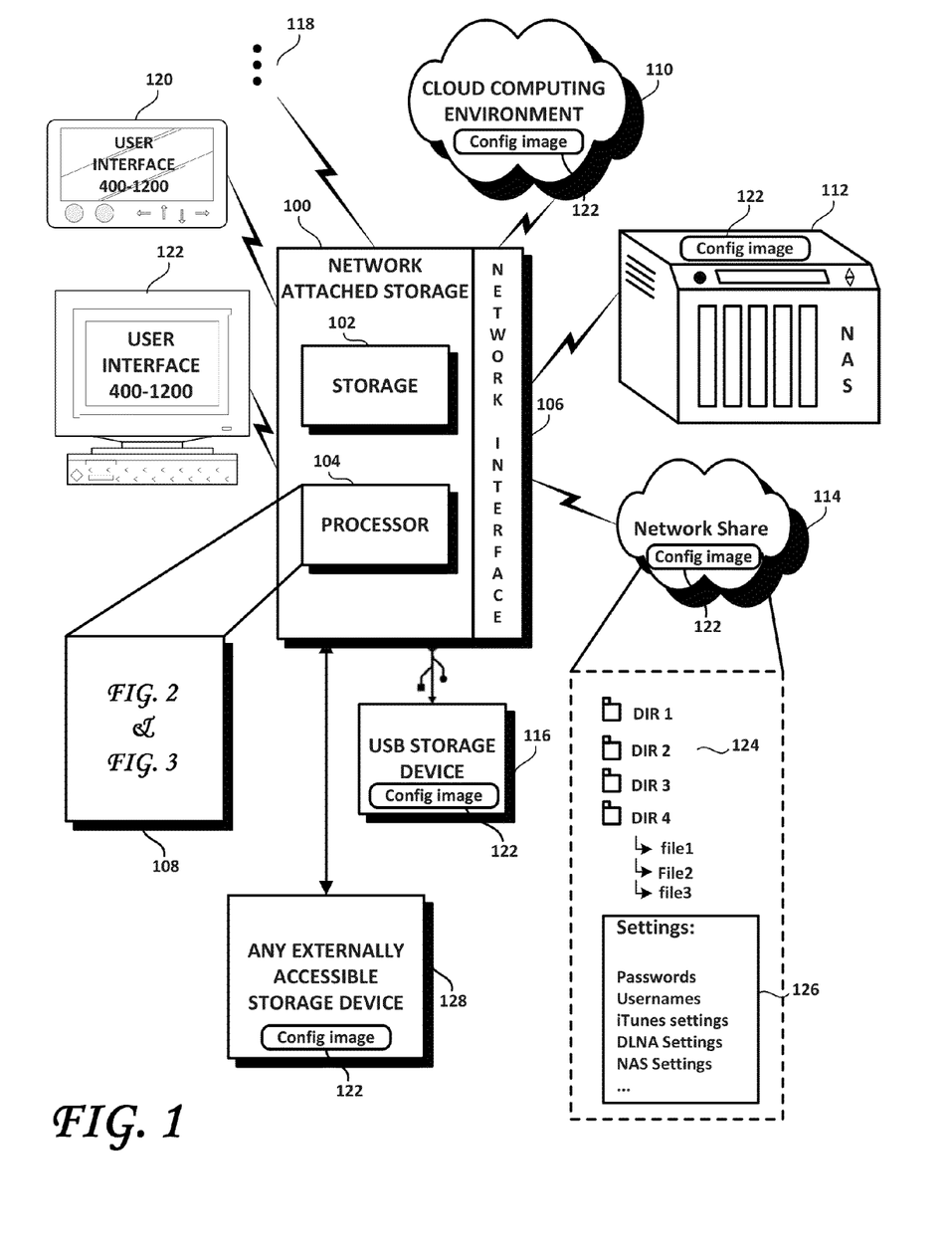
FIG. 1 shows a block diagram of NAS device, according to one embodiment.

FIG. 1 shows a block diagram of NAS device 100, according to one embodiment. The NAS device 100 may comprise storage 102, such as magnetic non-volatile storage, solid state non-volatile storage or hybrid forms of magnetic and solid state storage. The storage 102 may be configured, for example, as a Redundant Array of Inexpensive Disks (RAID). The NAS device 100 may also comprise a processor 104 (or multiple processors 104). The processor 104 may be operative and configured to, according to embodiments, carry out the computer-implemented methods shown in FIGS. 2 and 3 as suggested at 108, as well as the functionality described herein below with reference to FIGS. 1-12. According to one embodiment, the NAS device 100 may be configured to create a NAS configuration image 122 that is operative to enable another NAS device to migrate from a first operational state comprising first system settings to a second operational state comprising second system settings, which may be the same or a similar operational state as the image-creating NAS, as of the time when the image was created.

The NAS device 100, according to one embodiment, may comprise and/or define an operational state. According to one embodiment, the operational state of the NAS device 100 may comprises user data 124 and system settings 126. The system settings 126 of the operational state of the NAS device 100 may comprise, according to one embodiment, NAS settings that define the functionality of the NAS device. The system settings 126 of the operational state of the NAS device 100 may also comprise, according to one embodiment, user settings. The user settings may comprise, for example, user access credentials such as usernames and passwords, and user application settings for third party software such as iTunes® settings, Flickr® settings, Gmail® settings, settings for DLNA-enabled devices and the like. The NAS settings may comprise, for example, settings that configure the NAS device 100 such as, for example, RAID settings, permissions, authorized users, backup and refresh schedules, data versioning settings and/or any settings that would be effective, whether singly or in combination, to define the state and functionality of the NAS device 100. The user data 124 may comprise user directory structures and may be configured to be stored in a non-compressed and non-encrypted format that is readily accessible and readable by suitable user applications. Such user data 124 and system settings 126 are collectively and non-exclusively referred to herein as "operational state" and constitute a snapshot of the NAS device 100 as of the point in time at which the NAS configuration image 122 was created.

The NAS device 100 may also include one or more network interfaces 106, configured to enable the NAS device 100 to access one or more networks. For example, the network interface 106 of the NAS device 100 may be configured to enable the NAS device 100 to access the Internet, a Local Area Network (LAN), a Wide Area Network (WAN), a cloud computing environment 110, a remote NAS device 112, a network share 114, a personal computer 118 and/or a tablet 120. The NAS device 100 may also couple to a USB-connected device, such as a USB storage device 116. The NAS device 100 may also be configured to access any other external devices and/or services directly (e.g., locally) or indirectly coupled thereto, such as collectively suggested at reference 118 in FIG. 1. The NAS device 100 may also be configured to couple to any externally accessible storage device, collectively referenced at numeral 128 in FIG. 1. For example, reference numeral 128 may comprise an ESATA device, a Thunderbolt device, a FireWire device or any secondary storage device that is accessible to the NAS device 100.

According to one embodiment, the processor(s) 104 may be configured to identify a NAS configuration image stored on an externally accessible storage device. This identification may comprise discovering available externally accessible storage devices. NAS configuration images 122 may be stored on and/or retrieved from any locally coupled externally accessible storage device as shown at 128, or from any storage device coupled to the network. Moreover, such externally accessible storage devices may comprise a USB storage device 116 coupled to the NAS device 100 and/or some other storage device that is otherwise accessible to the NAS device 100 over a network, such as another NAS device 112, a network share 114 or a cloud computing and storage environment, as shown at 110. The processor 104 of the NAS device 100 may (before or after the identification of the externally accessible storage device) create a NAS configuration image 122 of the NAS device 100 and thereafter store the created NAS configuration image 122 on one or more selected externally accessible storage device or media. That is, the created NAS configuration image 122 may be stored on any externally accessible storage device such as, for example, a remote server, a USB storage device 116, a network share 114, a remote cloud computing and storage environment 110, a locally connected storage device 128 and/or even on another NAS device, such as shown at 112 in FIG. 1. Indeed, the created NAS configuration image 122 may be stored on more than one externally accessible storage device, for robustness, availability and redundancy purposes. As noted above and according to one embodiment, the NAS configuration image 122 may comprise the operational state of the NAS device 100 and may be operative to enable an other NAS device (such as NAS device 112, for example) to migrate from a first operational state to the operational state of the NAS device 100 (or a state that is similar thereto), as of the date and time at which the NAS configuration image was created.

For illustrative purposes, the following assumes that the NAS device 112 is the other NAS device that is enabled, by the created and stored NAS configuration image 122, to migrate from its first operational to the operational state of the NAS device 100, which NAS device has created and stored a NAS configuration image on any one of the externally accessible storage devices shown in FIG. 1. The first operational state may be a current state of the NAS device 112. According to one embodiment, the first operational state may be a default operational state. According to one embodiment, the first operational state may be an operational state of a new or factory fresh NAS device. In this case, the created NAS configuration image 122 may be effective to enable the NAS device 112 to migrate from a factory fresh (e.g., out-of-the-box) operational state or some other default operational state, to the same or similar state as the NAS device 100 that created the NAS configuration image 122, as of the date and time of the creation of the NAS configuration image on which the migration is based.

The created and stored NAS configuration image 122 may be configured as a one-time NAS configuration image or updated or refreshed by the NAS device 100 over time. For example, the processor 104 may cause the NAS configuration image 122 stored on the externally accessible storage device to be updated, either through the creation and storage of an entirely new NAS configuration image 122 or through an incremental update process, through which only changed portions of the NAS configuration image 122 are updated.

According to one embodiment, the processor 104 of the NAS device 100 may be configured to create and store a plurality of versions of the NAS configuration image 122 on the externally accessible storage device or devices.

According to one embodiment, the NAS configuration image or NAS configuration to images 122 having been thus created, the NAS device 112 may be directed and configured to determine whether the NAS configuration image created by NAS device 100 is compatible with the NAS device 112. Assuming that the NAS configuration image is, in fact, compatible with the NAS device 112, the NAS device 112 may receive or otherwise access a copy of the stored NAS configuration image from the or a selected externally accessible storage device where the NAS configuration image 122 is stored. The system settings stored in the received copy of the NAS configuration image may then be compared to the system settings of the NAS device 112 to identify compatible system settings. Assuming that at least some of the system settings stored in the received copy of the NAS configuration image are compatible with the system settings of the NAS device 112, the system settings of the NAS device 112 may be modified based on the compatible system settings, to enable the NAS device 112 to migrate (e.g., re-configure itself) from its current operational state to an operational state defined by the received or otherwise accessed copy of the NAS configuration image 122.

In detail, the NAS device 112 may comprise or define a first operational state. The first operational state may (but need not) comprise system settings that comprise NAS settings and user data. The system settings may comprise user settings and/or NAS settings. In the case in which the NAS device 112 is a factory-fresh NAS device, there may not be any user data or user settings stored therein. Moreover, the NAS settings of the first operational state of the NAS device 112 may be the NAS settings of a factory fresh NAS device. As does the NAS device 100, the NAS device 112 may include a network interface configured to couple to a network. The NAS device 112 may be coupled, through its network interface, to the same and/or other externally accessible storage device as is the NAS device 100. The NAS device 112 may also comprise one or more processors coupled to the network interface of the NAS device 112. According to one embodiment, such a processor or processors may be configured to carry out the functionality described above to migrate from a first operational state to a second operational state. In so doing, the NAS device 112 may receive a communication that identifies at least a storage device that is accessible over the network and that stores the NAS configuration image 122 that comprises an operational state of the NAS device (such as NAS device 100) having created the NAS configuration image 122. For exemplary purposes only, and with continued reference to FIG. 1, it is assumed herein that the communication identified network share 114 as the externally accessible storage device that stores the NAS configuration image 122. Upon receipt of the communication, the NAS device 112 may access the network share 114 as the identified storage device and verify the compatibility of the NAS configuration image 122 with the NAS device 112. Thereafter, the NAS device 112 may download, receive or otherwise access a copy of the stored NAS configuration image 122 from the network share 114 to the NAS device 112. Alternatively, the compatibility verification may be carried out after the copy of the NAS configuration image 122 is received.

The NAS device 112 may then migrate, based on the received NAS configuration image 122, from the first operational state (e.g., its current operational state, whatever that may be) to a second operational state, which may be a state that is the same or similar to the operational state of the NAS device 100 having created the NAS configuration image, as of the date and time at which the NAS configuration image 122 was created. To do so, the NAS device 112 may compare the system settings of the received copy of the NAS configuration image 122 with the system settings of its current operational state to identify compatible system settings. Such compatible system settings may comprise both compatible NAS settings and compatible user settings. To migrate from its current operational state to the operational state of the NAS device 100 having created the NAS configuration image, the NAS device 112 may modify its current system settings based on the identified compatible system settings. Such modifications may take the form of replacing the current system settings of the NAS device 112 with the identified compatible system settings. The first operational state of the NAS device 112 may, in like manner be saved on an externally accessible storage device, to enable the NAS device 112 to return to that first operational state, if such becomes desirable.

The NAS device 112 may then be configured according to the system settings in the received NAS configuration image 122 such that, functionally and logically, it assumes the operational state of the NAS device 100 or an operational state that is similar thereto, as of the date and time at which the NAS configuration image 122 was created. As the NAS configuration image 122 may also comprise user data 124, the migrated NAS device 112 may not only be configured according to the system settings 126 of the NAS device 100 that created the NAS configuration image 122, but may also comprise the user data 124 of the NAS device 100, as of the time when the NAS configuration image 122 was created. The thus migrated and configured NAS device 112 may then store the same user data or a subset of the data of the NAS device 100 did as of the date and time it created the NAS configuration image 122 and be configured and operate as did or similarly to the NAS device 110 (as not all system settings may be compatible with the NAS device 112), as of the time and data at which the NAS device 100 created the NAS configuration image 122. According to one embodiment, the identified storage device 114 may store a plurality of versions of the NAS configuration image 122 and the communication received by the NAS device 112 may identify which of the plurality of versions of the NAS configuration images 122 is to be selected and used to migrate the NAS device 112.

Figure 2:
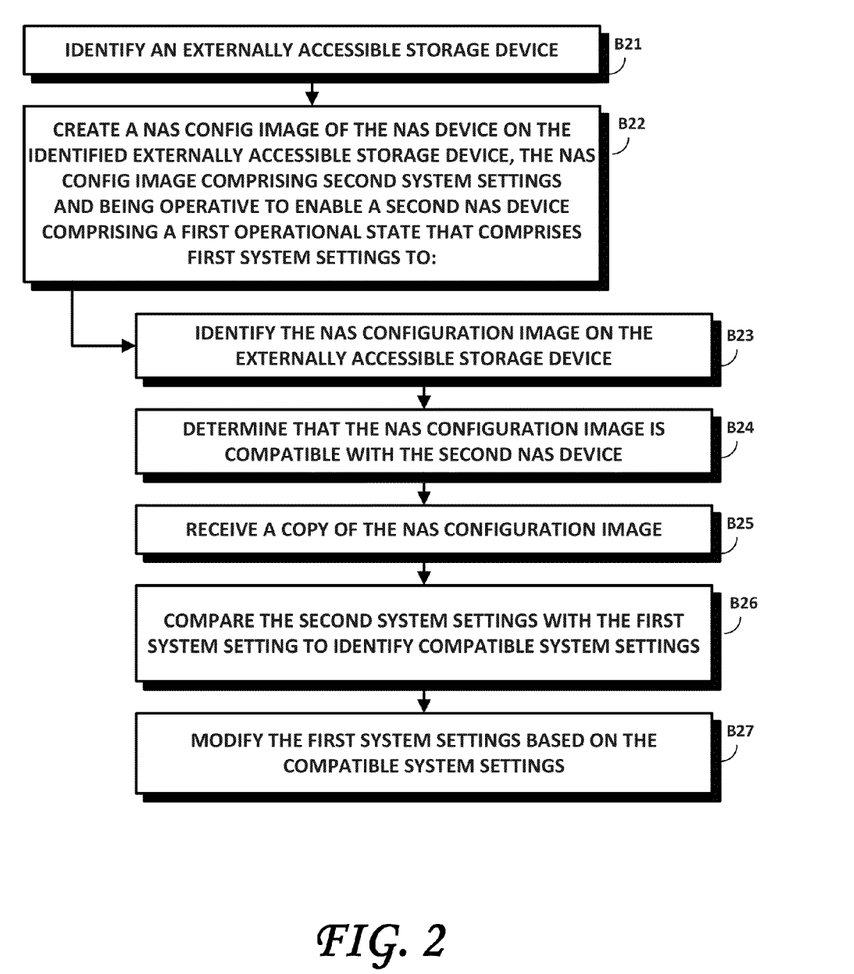
FIG. 2 shows a flowchart of a computer-implemented method for a NAS device to create a NAS configuration image configured to enable another NAS device to migrate from a first operational state to a second operational state, according to one embodiment.

FIG. 2 shows a flowchart of a computer-implemented method for a first NAS device to create a NAS configuration image that is configured to enable a second NAS device to migrate from a first operational state to a second operational state, according to one embodiment. As shown, block B21 calls for the processor 104 (FIG. 1) of the first NAS device (e.g., 100 in FIG. 1) to identify an externally accessible storage device (such as shown at 110, 112, 114, 122 or 128 in FIG. 1). Block B22, calls for the processor of the first NAS device to be configured to create a NAS configuration image and store the created NAS configuration image on the identified externally accessible storage device. The created NAS configuration image may comprise second system settings and may be operative to enable the functionality of blocks B23 to B27. Block B23 calls for the created NAS configuration image to be operative to enable a second NAS device (e.g., 112 in FIG. 1) comprising a first operational state that comprises first system settings to identify the NAS configuration image on the externally accessible storage device. At block B24, the created NAS configuration image may be further configured to determine that the NAS configuration image, created by the first NAS device, is compatible with the second NAS device. If the created NAS configuration image is indeed determined to be compatible with the second NAS device, block B25 calls for the second NAS device to receive a copy of the NAS configuration image created by the first NAS device. The second NAS device, having received the copy of the NAS configuration image created by the first NAS device, may then compare the second system settings in the received copy of the NAS configuration image created by the first NAS device with the first system settings of the second NAS device to identify compatible system settings, as shown at block B26. Lastly, block B27 calls for the created NAS configuration image to enable the second NAS device to modify the first system settings of the second NAS device based on compatible settings (system settings of NAS configuration image created by the first NAS device that are compatible with the first system settings of the second NAS device). If the determination in block B24 reveals that the NAS configuration image is not compatible with the second NAS device or if the comparison in block B26 reveals no compatible system settings, block B27 may be omitted and the first system settings may be left unmodified.

Figure 3:
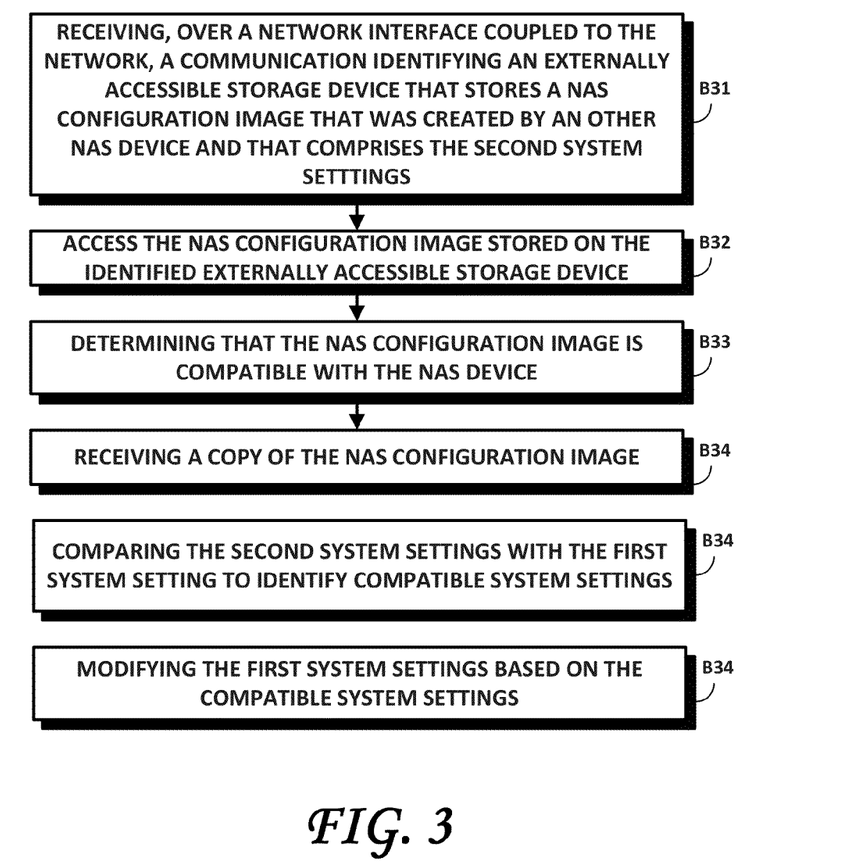
FIG. 3 is a flowchart of a computer-implemented method for a NAS device to migrate from a first operational state to a second operational state, based upon a NAS configuration image, according to one embodiment.

FIG. 3 is a flowchart of a computer-implemented method for a NAS device to migrate from a first operational state to a second operational state, based upon a NAS configuration image, according to one embodiment. As shown, block B31 calls for receiving, over a network interface coupled to a network, a communication identifying an externally accessible storage device that stores a NAS configuration image that was created by another NAS device and that comprises the second system settings. Block B32 calls for accessing the NAS configuration image stored on the identified externally accessible storage device, and block B33 for determining that the NAS configuration image is compatible with the NAS device. If the accessed NAS configuration image stored on the identified externally accessible storage device is indeed compatible with the NAS device, block B34 calls for the NAS device to receive a copy of the NAS configuration device stored on the identified externally accessible storage device. At B34, the NAS device compares the second system settings (from the received copy of the NAS configuration image) with the first system settings of the NAS device's first operational state. If one or more of the second system settings are compatible with the first system settings, the first system settings may be modified based on the compatible system settings, as called for by block B34.

Figure 4:
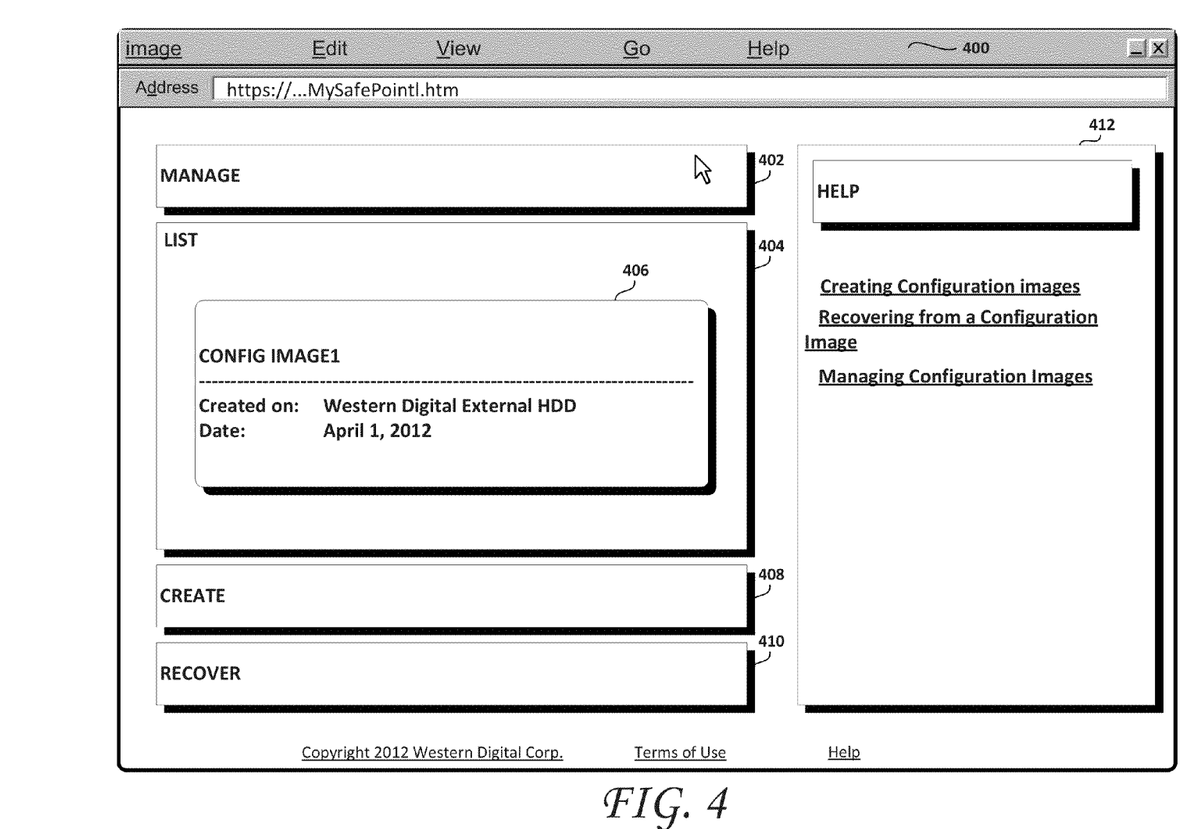
FIG. 4 shows an example user interface configured to manage NAS configuration images, according to one embodiment.

FIG. 4 shows an example user interface 400 configured to manage NAS configuration images of NAS devices, according to one embodiment. As shown therein, the user interface 400 may be a Web-based user interface, rendered on a user device such as, for example, a personal computer or a tablet computer, as shown at 120 and 122 in FIG. 1. The user interface 400 may include, for example, a home screen as shown in FIG. 4, that may be configured to enable the user to manage the NAS configuration images as shown at tab 402, to create NAS configuration images as shown at tab 408, and to recover from a NAS configuration image (e.g., cause a selected NAS device to migrate from a first operational state to the operational state defined by a stored NAS configuration image) as shown at tab 410. A Help tab 412 may also be provided, to enable the user to access detailed help information on topics such as, for example, creating NAS configuration images, recovering from a NAS configuration image or managing NAS configuration images. If, as shown in FIG. 4, the Manage tab 402 is selected, a list of available NAS configuration images 406 may be provided, as shown at 404.

Figure 5:
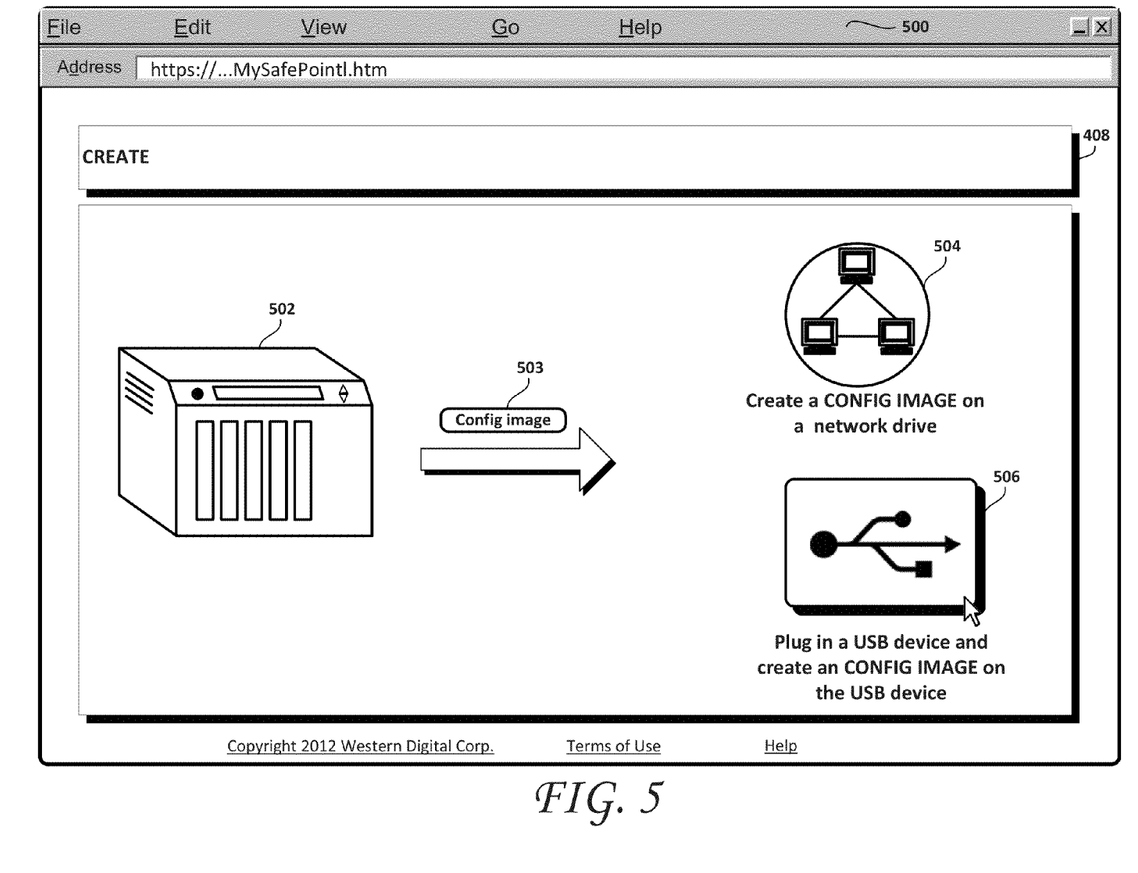
FIG. 5 shows an example user interface configured for creating NAS configuration images, according to an embodiment.

Upon selecting the create tab 408, the exemplary user interface 500 of FIG. 5 (or a functionally similar user interface) may be provided. As shown therein, the exemplary user interface 500 may include a graphic of a NAS device 502, a graphic 504 suggestive of creating a NAS configuration image on a network drive and another graphic 506 suggestive of creating a NAS configuration image on, for example, a connected USB device. Other graphics may be provided to enable the user to create NAS configuration images on most any externally accessible storage device. Indeed, the network drives and the connected USB devices are mere examples of externally accessible storage devices on which a NAS configuration image comprising or defining the operational state of the NAS device 502 may be created and stored, according to one embodiment. An arrow graphic 503 is clearly suggestive of the NAS configuration image 122 being created from the NAS device 502 and being stored on either a network drive as shown at 504 or to a connected USB device as shown at 506.

Figure 6:
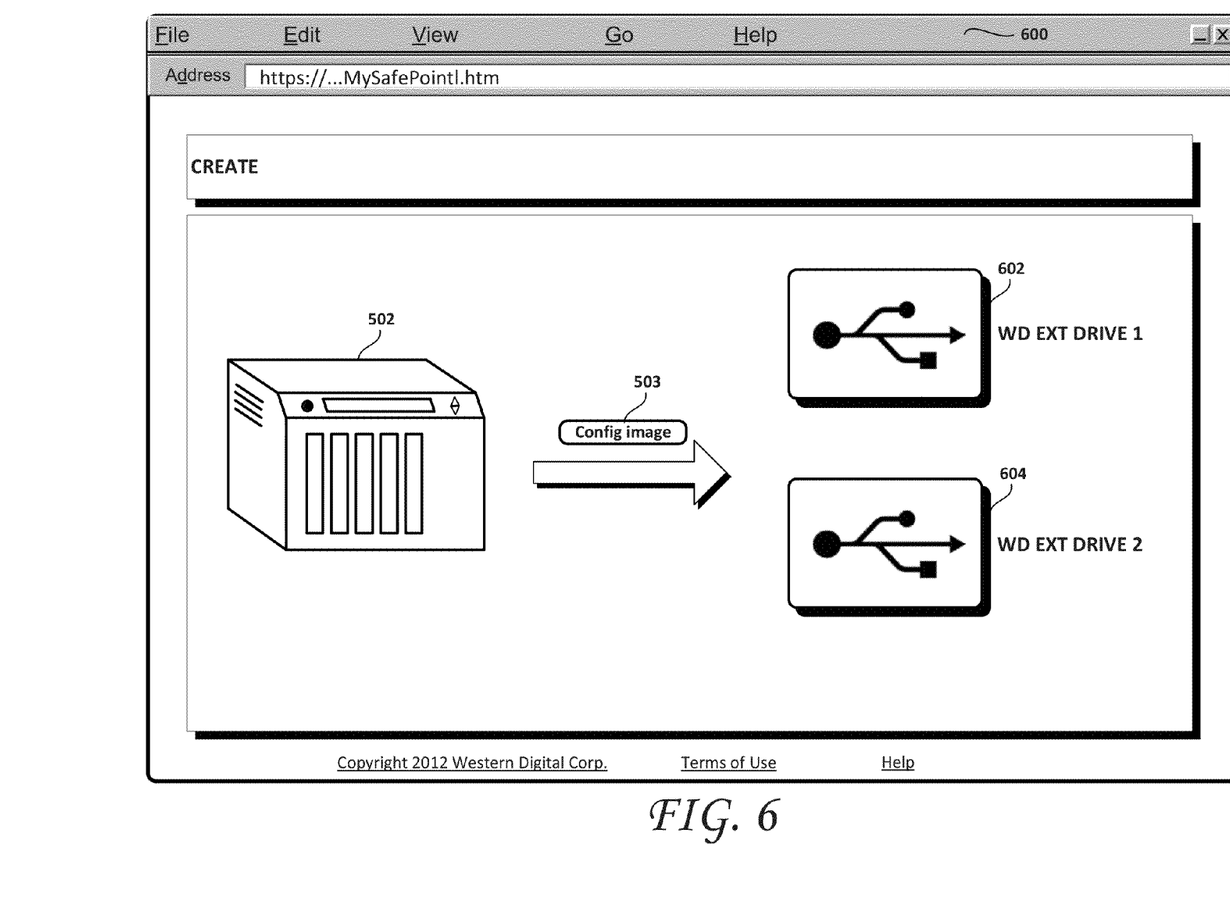
FIG. 6 shows an example user interface configured to create NAS configuration images on a USB-connected device, according to one embodiment.

FIG. 6 shows an example user interface 600 configured to create a NAS configuration image of a NAS device 502 on a USB-connected device 602, 604, according to one embodiment. The exemplary user interface 600 may be rendered after the user has selected (e.g., mouse clicked) the graphic 506 suggestive of creating a NAS configuration image of NAS device 502 on a connected USB device. According to one embodiment, the externally accessible USB storage device may then be identified and shown in graphic form (for example) at 602 and 604. Indeed, reference numerals 602 and 604 denote available externally accessible USB drives on which a NAS configuration image comprising the operational state of the NAS device 502 may be created and stored, according to one embodiment.

Figure 7:
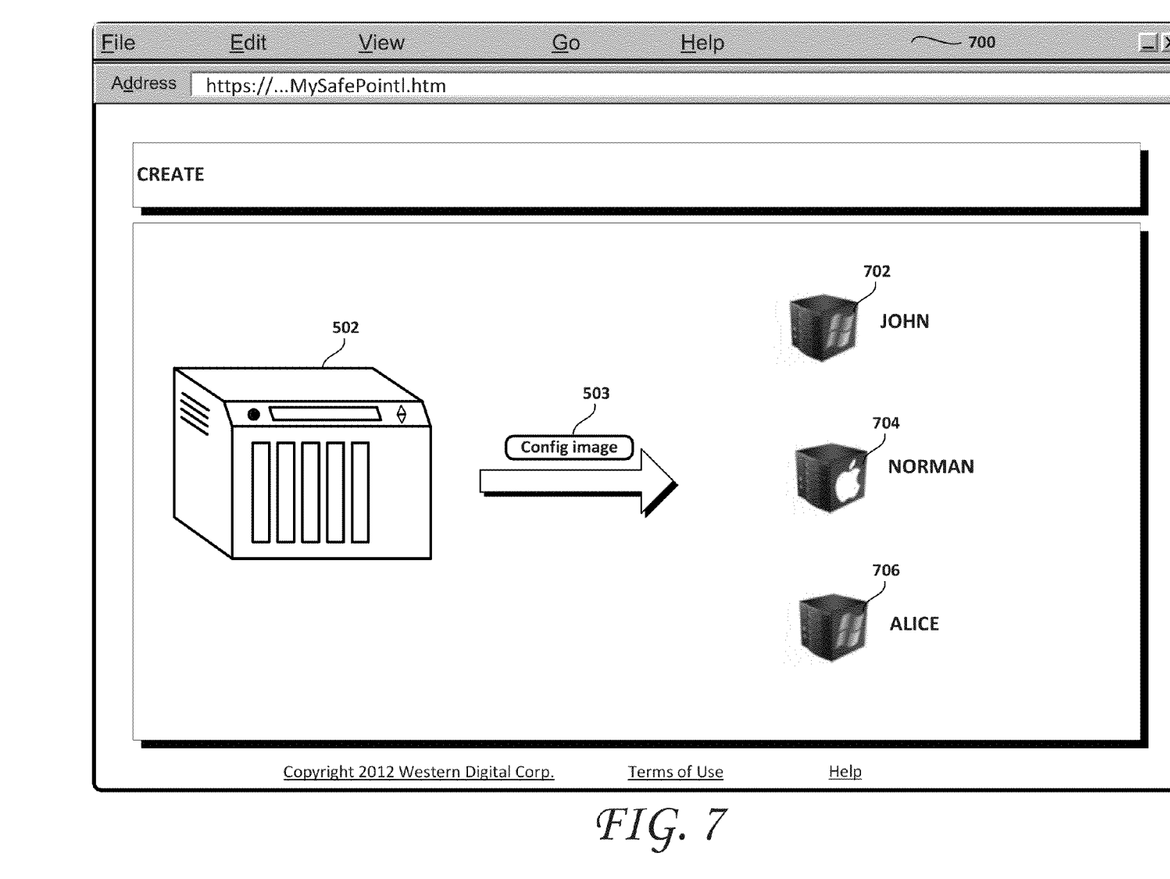
FIG. 7 shows an example user interface configured to create a NAS configuration image on a network-connected device, according to one embodiment.

FIG. 7 shows an exemplary user interface 700, rendered after the user has selected (e.g., mouse clicked) the graphic 504 suggestive of creating a NAS configuration image of NAS device 502 on a network drive. According to one embodiment, the available externally accessible storage device (in this case, network drives) may then be identified and shown in to graphic form (for example) at 702, 704 and 706. Indeed, 702, 704 and 706 are available externally accessible network drives on which a NAS configuration image defining the operational state of the NAS device 502 may be created and stored, according to one embodiment.

Figure 8:
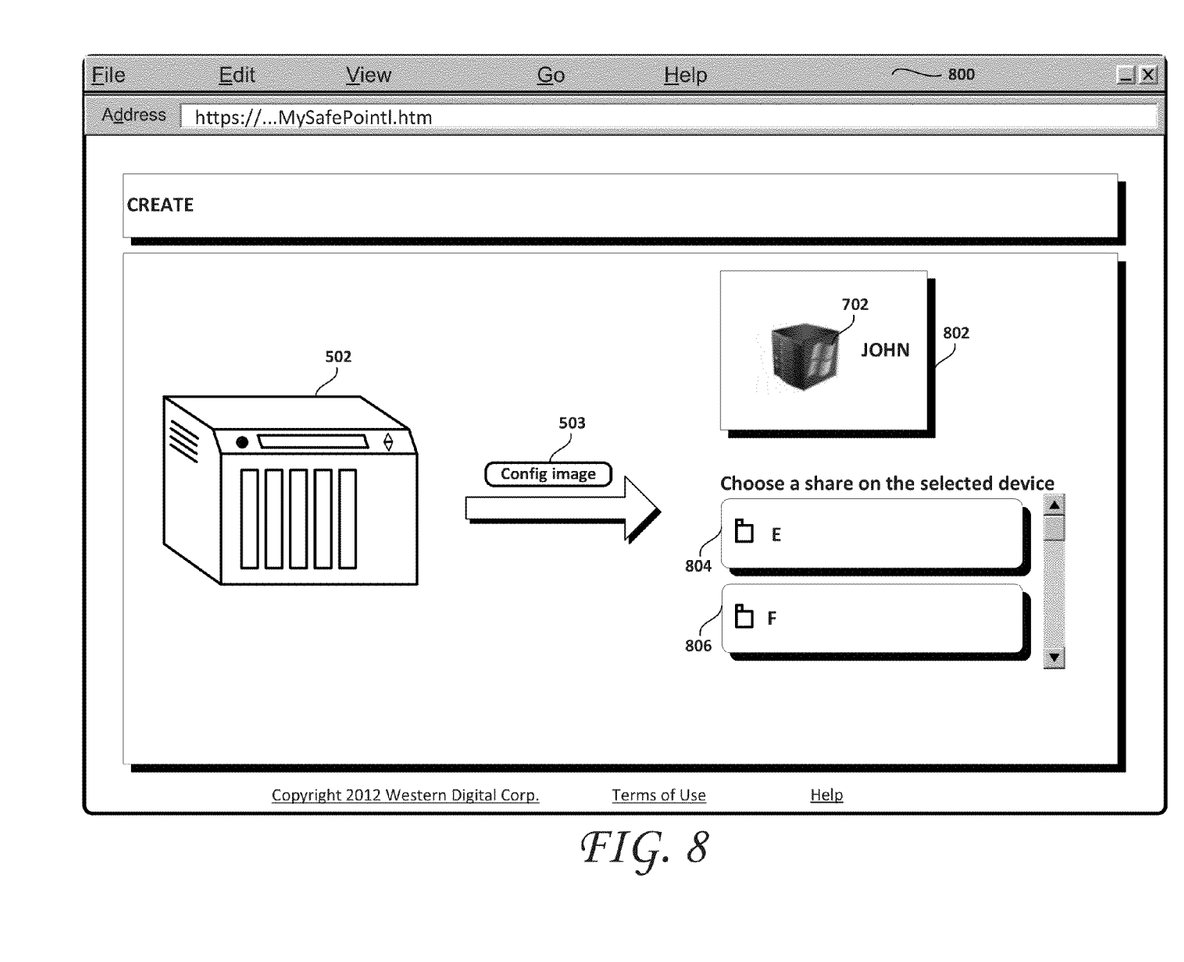
FIG. 8 shows an example user interface configured to create a NAS configuration image on a share of a selected network-connected device, according to one embodiment.

FIG. 8 shows an example user interface 800 configured to create a NAS configuration image of a NAS device 502 on a share 804, 806 of a selected network-connected device 702, according to one embodiment. Indeed, in FIG. 8, the user has selected, as indicated at 802, network drive 702 as the externally accessible storage device on which to create the NAS configuration image of the NAS device 502. The selected network drive 702, in this example, includes two shares, namely "E" share 804 and "F" share 806. Subject to appropriate authentication and/or permissions, the user may select either one of these two network shares 804, 806 as the target for the NAS configuration image to be created.

Figure 9:
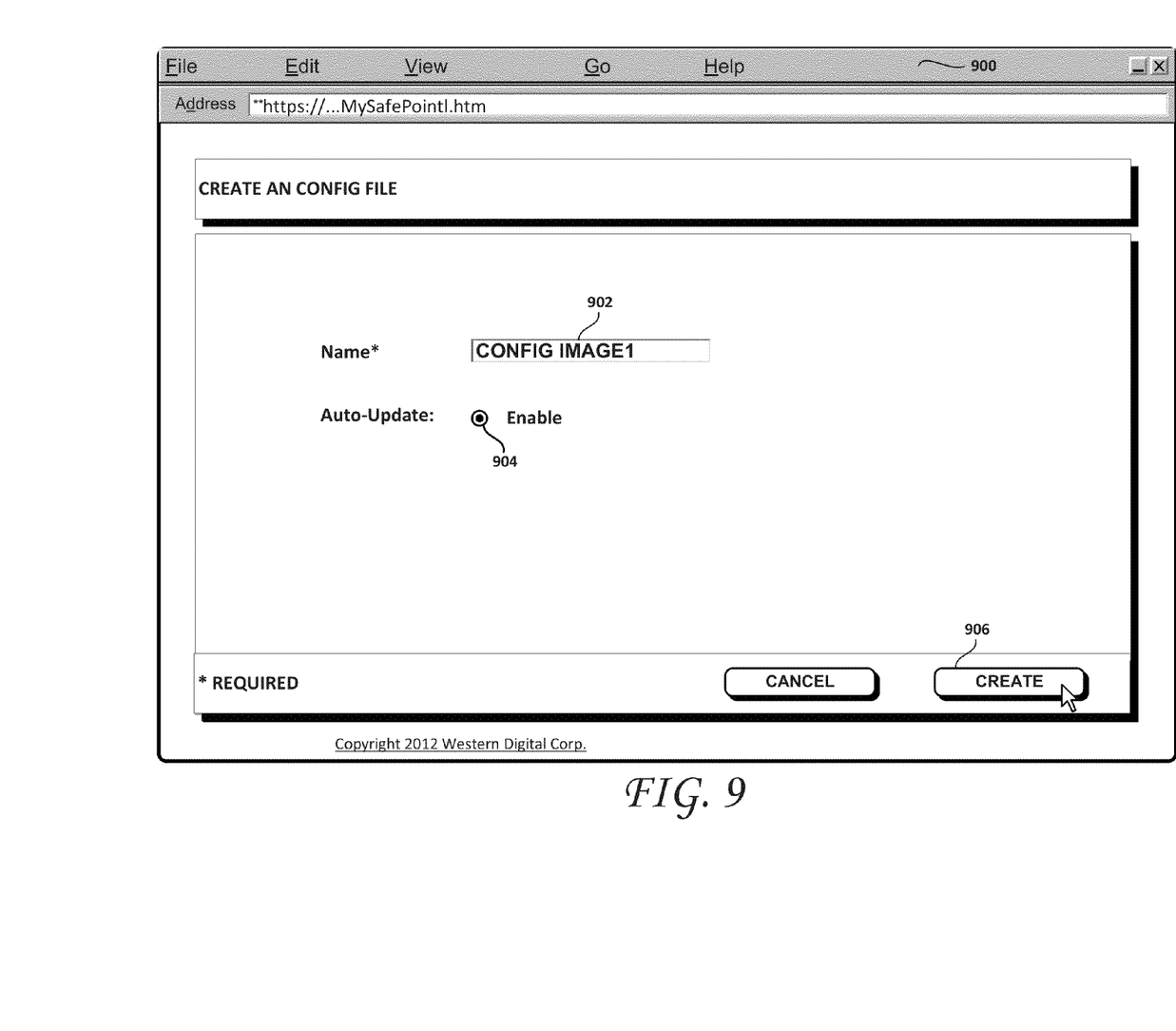
FIG. 9 shows an example user interface configured to create a NAS configuration image, according to one embodiment.

FIG. 9 shows an example user interface 900 configured to create a NAS configuration image of a NAS device, according to one embodiment. As shown in FIG. 9, the user may be prompted to enter the name of the NAS configuration image, as shown at 902. By clicking the radio button 904, the user may enable an auto-update feature, by which the created NAS configuration image may be automatically updated, based upon, for example, a pre-selected schedule or a predetermined event. After the user clicks the create tab 906, the NAS configuration image of the NAS device 502, including the settings (user settings and/or NAS setting) and user data, may be created and stored as "CONFIG IMAGE1" on the selected externally accessible storage device. Such a created NAS configuration image, according to one embodiment, may be operative to enable an other NAS device (such as, for example, NAS device 1002 of FIG. 10) to migrate from a first operational state to the operational state of the NAS device 502 or an operational state similar thereto, as of the date and time at which the NAS configuration image was created. According to one embodiment, in so doing, the other NAS device may modify selected system settings of the other NAS device based on compatible system settings of the NAS device 502, which NAS device 502 created the NAS configuration image 1003.

Figure 10:
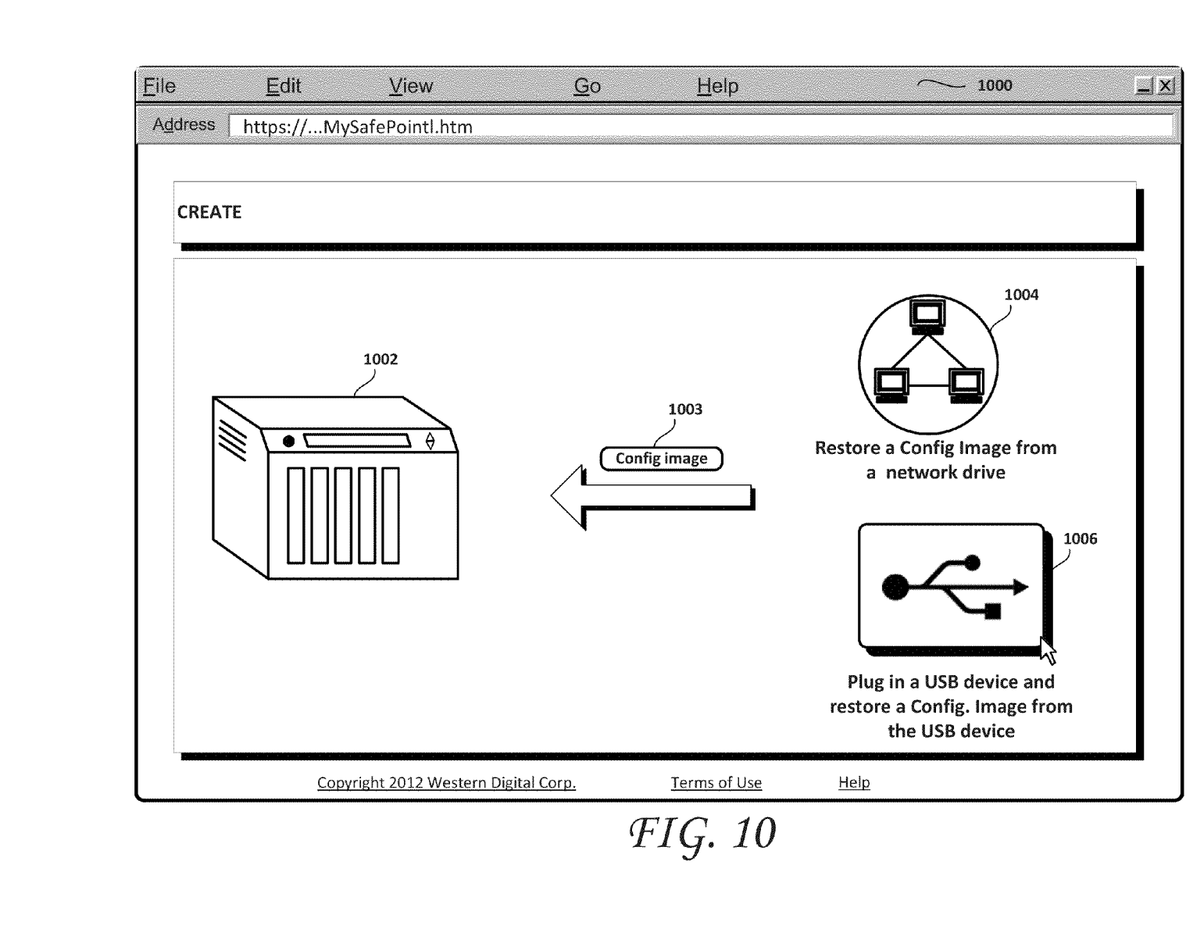
FIG. 10 shows an example user interface configured to restore a NAS configuration image to another NAS device, according to one embodiment.

Continuing with the example developed herein above, in the event that a NAS configuration image of the NAS device has previously been created and stored on a selected externally accessible storage device and in the event that the NAS device 502 has failed (for example), the user may desire to configure another NAS device to assume the operational state of the NAS device 502, as of the time the NAS configuration image thereof was created. FIG. 10 shows an example user interface 1000 configured to restore a NAS configuration image of a NAS device (such as, for example, NAS device 502) on another NAS device 1002, according to one embodiment. The NAS device 1002 has a first operational state, which may comprise system settings and/or user data. The system settings of the NAS device 1002 may comprise NAS settings and user settings. According to one embodiment, the first operational state of the NAS device 1002 is the operational state of a factory-fresh "out-of-the-box" NAS device. As such, the first operational state of the NAS device 1002 may include system settings of a factory-fresh NAS device but may not comprise any user data and/or user settings. As shown in FIG. 10, the user of a device such as, for example, the personal computer 118 or the tablet computer 120 shown in FIG. 1, may select to restore a NAS configuration image, as suggested at 1003, from a network drive as shown at 1004 or may select to plug in (if not already plugged in) a USB device and restore a NAS configuration image from the USB device, as shown at 1006. The user may have a-priori knowledge of where the desired NAS configuration image to be restored on the NAS device 1002 is located. Alternatively, suitable NAS configuration images may be discovered and identified on externally accessible storage devices and the discovered NAS configuration images may be thereafter displayed for selection by the user.

Figure 11:
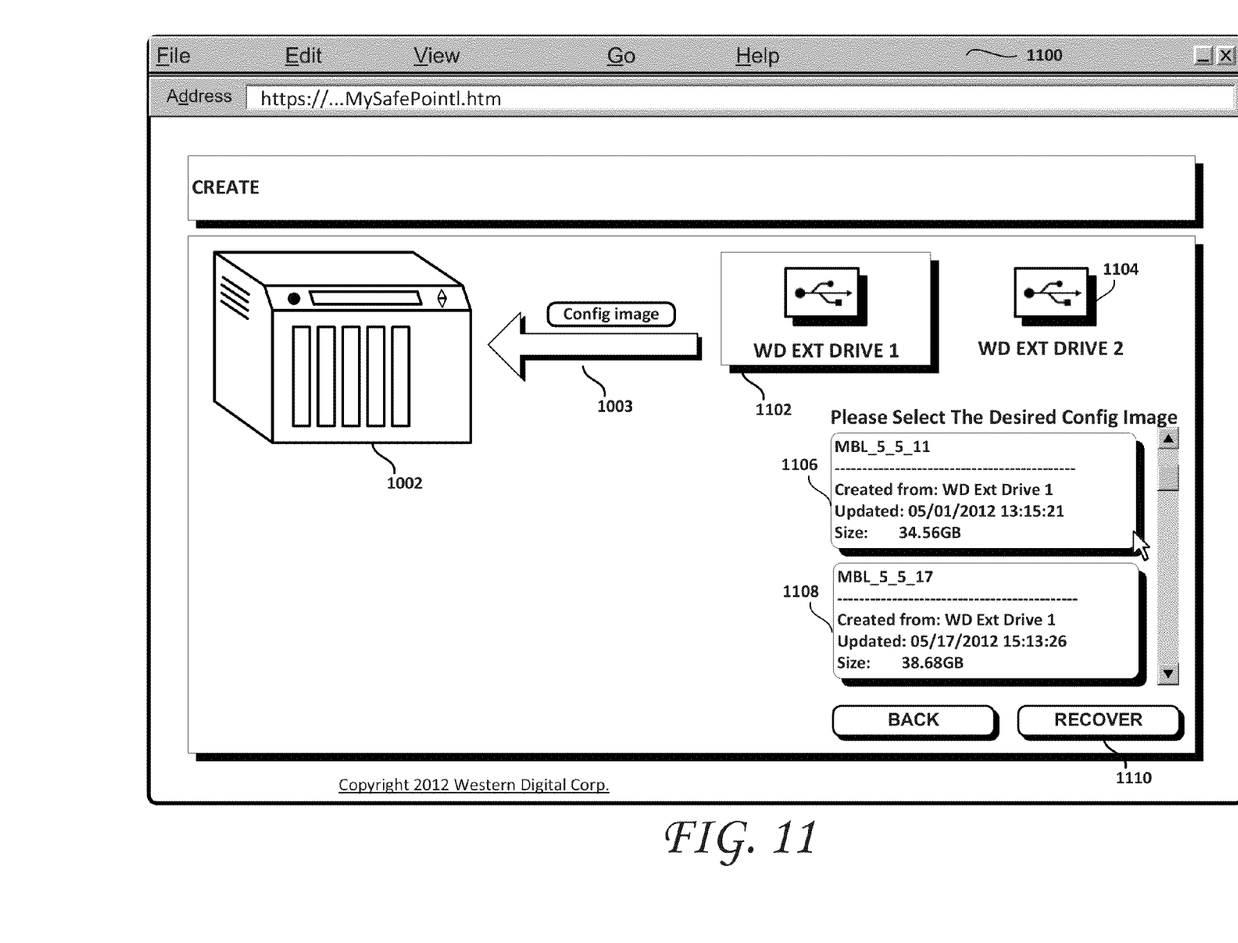
FIG. 11 shows an example user interface configured to enable a user to select one of a plurality of NAS configuration images on an externally accessible storage device, according to one embodiment.

As shown in FIG. 10, it is assumed herein below that the user has selected to restore a NAS configuration image from a USB device. FIG. 11 shows an example user interface 1100 configured to enable a user to select one of a plurality of NAS configuration images of a NAS device 502 on an externally accessible USB storage device, according to one embodiment. As shown, two connected USB devices are available; namely 1102 and 1104. Each may store a NAS configuration image. In this example, the user has selected to restore a NAS configuration image stored on USB device 1102, which comprises two NAS configuration images, referenced at 1106 and 1108 in FIG. 11. As also shown, the user has selected NAS configuration image 1106 as the NAS configuration image to restore on the NAS device 1002. The NAS device 1002 may then receive a communication that at least identifies the selected USB drive 1102 as a storage device that is accessible over the network and that stores the selected NAS configuration image 1106 that comprises an operational state of an other NAS device having created the NAS configuration image—such as NAS device 502 in the example being developed herein. When the user selects the restore tab 1110, the identified storage device (USB drive 1102, in this example) may then be accessed and the NAS configuration image 1106 stored therein may be accessed by the NAS device 1102. A determination may then be made whether the stored NAS configuration image is compatible with the NAS device 1002. If so, a copy of the compatible NAS configuration image may be received by the NAS device 1002. The system settings of the NAS device 1002 and the system settings of the received copy of the NAS configuration image 1106 may then be compared to identify compatible system settings. The NAS device 1002 may then migrate, based on the compatible system setting of the received or otherwise accessed NAS configuration image 1106, from a first operational state to the operational state of the other NAS device having created the NAS configuration image 1106. The migration may comprise modifying the system settings of the NAS device 1002 based on the compatible system settings from the copy of the NAS configuration image 1106 received by the NAS device 1002. Not all system settings may be compatible, so the operational state of the NAS device 1002 may not exactly match the operational state defined by the NAS configuration image 1106. Any user data in the received copy of the NAS configuration image 1106 may also be copied to the NAS device 1002. In the example being developed herein, the other NAS device having created the NAS configuration image 1106 is the NAS device 502 shown in FIGS. 1 and 5-8. For example, the NAS device 502 may have failed, which failure necessitates configuring its replacement NAS device 1002 according to the user data and settings within the selected NAS configuration image 1106 of the now-failed NAS device 502. For example, the NAS device 1102 may be factory fresh or may have some other initial operational state, which initial operational state is migrated to the operational state defined by the selected NAS configuration image 1106 through modification of system settings based on the compatible system settings of the NAS configuration image 1106. The migration from a first operational state to a second operational state defined by the NAS configuration image may include comprise modifying system settings as well as copying or modifying user data on the target NAS device 1002 based on the user data from the NAS configuration image 1106, thereby configuring the target NAS device according to both modified (and/or copied) system settings and user data. The target NAS device, such as NAS device 1002, may be required to reboot before some system settings take effect. An end result of the migration is that the target NAS device 1002 now looks like or may appear to be similar to, from a functional point of view, the NAS device 502 from which the NAS configuration image 1106 was created, as of the time at which the NAS configuration image 1106 was created.

Figure 12:
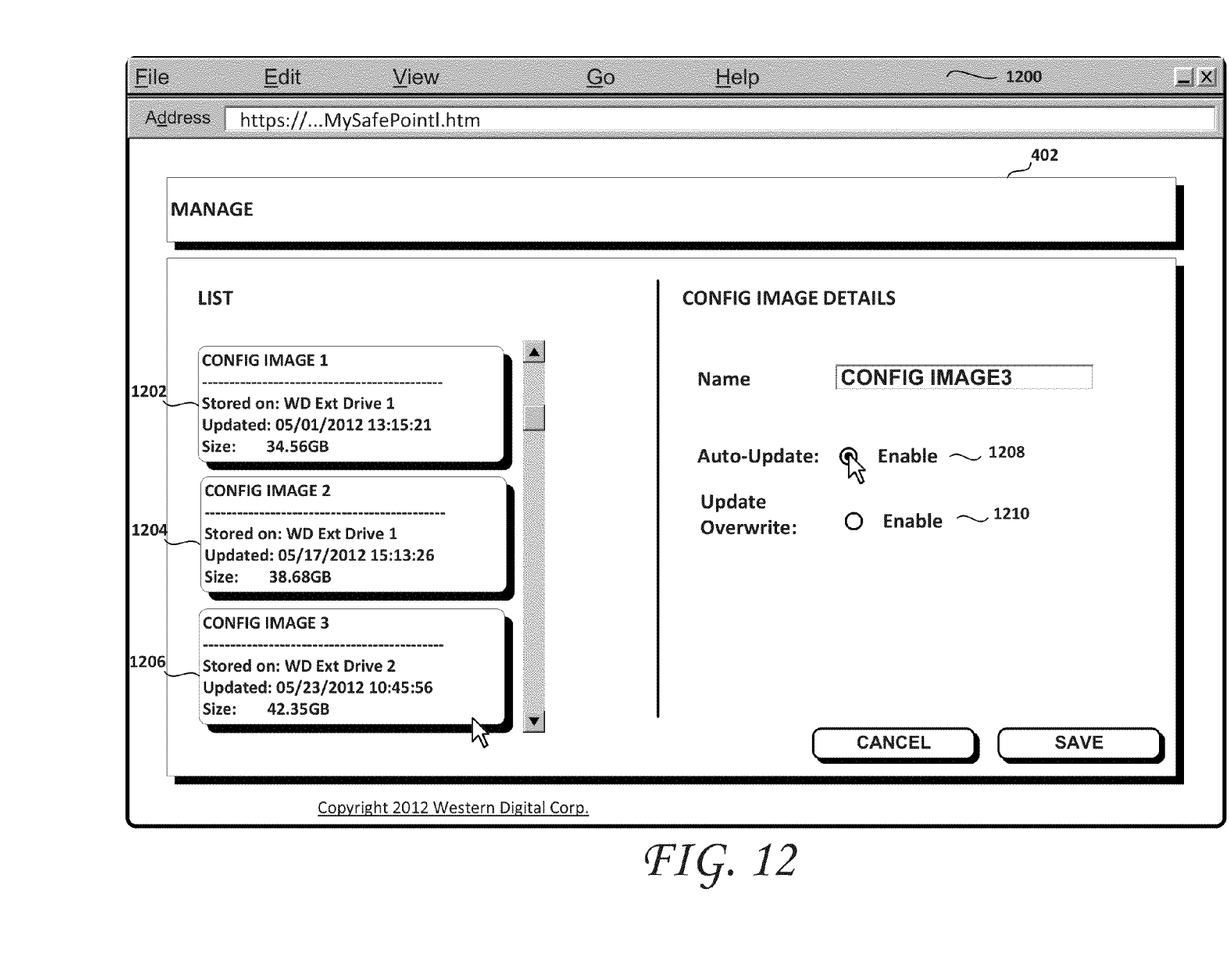
FIG. 12 shows an example user interface configured to enable the management of NAS configuration image, according to one embodiment.

FIG. 12 shows an example user interface 1200 configured to enable the management of NAS configuration images of NAS devices, according to one embodiment. As shown therein, selecting the manage tab 402 may cause the user interface 1200 to list the accessible NAS configuration images which, in this example, comprise NAS configuration images 1202, 1204 and 1206. Relevant characteristics may be included with each NAS configuration image such as, for example, the name of the NAS configuration image, the externally accessible storage device on which the NAS configuration image is stored, the date at which the NAS configuration image was last updated and the size of the NAS configuration image, to name but a few of the possible characteristics that may be listed. Upon selecting one of the displayed NAS configuration images 1202, 1204, 1206, the user may be given, according to one embodiment, the opportunity to configure one or more options. Such options may include, for example, enabling an auto-update function as shown at 1208 or enabling an update overwrite feature 1210, by which subsequent updates to the NAS configuration image overwrite the previous version thereof. Other options may be provided, as those of skill in this art may readily recognize.

According to one embodiment, the software that generates the user interfaces shown in FIGS. 4-12 may (but need not) run as an application on a NAS device, rather than under the control of a host. For example, a NAS Image Manager application may run on the NAS device or devices, which NAS Image Manager application may be configured according to the functionality described and shown herein. Such a NAS Image Manager application may utilize, for example, a virtual file system (VFS) to perform I/O operations and/or a sync command, which is a software command and network protocol for Unix-like and Windows systems that synchronizes files and directories from one location to another while minimizing data transfer using delta encoding when appropriate.

It is to be noted that the NAS configuration image or NAS configuration images created and stored on one or more externally accessible storage device may be accessed outside of the operational state migration methods described herein. Indeed, as the system settings and user data of a stored NAS configuration image may be stored as unencrypted and uncompressed user-readable directories and files in one embodiment, such NAS configuration images provide a convenient off-line copy of directories, files and settings for use, for example, when the original files become lost or corrupted, or for any other reason. The NAS configuration image or NAS configuration images created and stored on one or more externally accessible storage device need not only be used when the NAS device having created the NAS configuration image fails. Indeed, the created NAS configuration image may also facilitate upgrades of NAS device, by enabling the user to conveniently migrate from one NAS platform to a newer or upgraded NAS platform, without having to re-configure the newer or upgraded NAS platform, or reduce the need to do so.

While certain embodiments of the inventions have been described, these embodiments have been presented by way of example only, and are not intended to limit the scope of the inventions. Indeed, the novel methods, devices and systems described herein may be embodied in a variety of other forms. Furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions. For example, those skilled in the art will appreciate that in various embodiments, the actual structures may differ from those shown in the figures. Depending on the embodiment, certain of the steps described in the example above may be removed, others may be added. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

The invention claimed is:

1. A network-attached storage (NAS) device, comprising:
an operational state comprising first system settings;
a network interface configured to couple to a network;
a processor coupled to the network interface, the processor being configured to:
receive, from the network interface, a communication identifying an externally accessible storage device that a) is accessible from the network and that b) stores a NAS configuration image created by a second NAS device and comprising second system settings;
access, over the network, the identified NAS configuration image stored on the externally accessible storage device;

determine that the accessed NAS configuration image is compatible with the NAS device;

compare the second system settings with the first system settings to identify compatible system settings; and modify the first system settings based on the compatible system settings.

2. The NAS device of claim 1, wherein the externally accessible storage device is at least one of:
 a remote server accessible over a network;
 a cloud computing environment;
 a network share;
 a remote NAS device accessible over a network; and
 a secondary storage device accessible from the network.

3. The NAS device of claim 1, wherein the second system settings comprise at least one of NAS settings defining a functionality of the NAS device and user settings.

4. The NAS device of claim 3, wherein the user settings comprise user access credentials and user application settings.

5. The NAS device of claim 1, wherein the NAS configuration image further comprises user directories and files and wherein the processor is further configured to copy the user directories and files from the received copy of the NAS configuration image to the NAS device.

6. The NAS device of claim 1, wherein the externally accessible storage device stores a plurality of versions of the NAS configuration image and wherein the processor is further configured to identify and select one of the plurality of versions of the NAS configuration images and wherein the received copy of the NAS configuration is the selected version of the NAS configuration image.

7. The NAS device of claim 1, wherein the first system settings are one of factory settings of a new NAS device and settings of a default operational state.

8. A network-attached storage (NAS) device, comprising:
 a second operational state comprising second system settings;
 a network interface configured to couple to a network, and
 a processor coupled to the network interface, the processor being configured to:
  identify an externally accessible storage device accessible from the network; and
  create a NAS configuration image of the NAS device; and
  send the created NAS configuration image to the identified externally accessible storage device for storage thereon, the NAS configuration image comprising the second system setting;
  wherein the NAS configuration image is operative to enable a second NAS device comprising a first operational state that comprises first system settings to receive, from the network interface, a communication identifying the identified externally accessible storage device that
   a) is accessible from the network and that
   b) stores the NAS configuration image
    to access, over the network, the NAS configuration image stored on the externally accessible storage device;
    to determine that the accessed NAS configuration image is compatible with the second NAS device;
    to compare the second system settings with the first system settings to identify compatible system settings; and
    to modify the first system settings based on the compatible system settings.

9. The NAS device of claim 8, wherein the externally accessible storage device comprises at least one of:
 a remotely server accessible over a network;
 a cloud computing environment;
 a network share;
 a remote NAS device accessible over a network; and
 a secondary storage device accessible from to the network.

10. The NAS device of claim 8, wherein the processor is further configured to update the NAS configuration image stored on the externally accessible storage device.

11. The NAS device of claim 8, wherein the first operational state is one of an operational state of a new NAS device configured with factory settings and a default operational state.

12. The NAS device of claim 8, wherein at least the second system settings comprise at least one of NAS settings defining a functionality of the NAS device and user settings.

13. The NAS device of claim 12, wherein the user settings comprise at least one of user access credentials and user application settings.

14. The NAS device of claim 8, wherein the NAS configuration image further comprises user directories and files stored on the NAS device and wherein the processor is further configured to copy the user directories and files from the NAS device to the NAS configuration image.

15. The NAS device of claim 8, wherein the processor is further configured to refresh, over the network, the NAS configuration image stored on the externally accessible storage device.

16. The NAS device of claim 8, wherein the processor is configured to create and store, over the network, a plurality of versions of the NAS configuration image on the externally accessible storage device.

17. A computer-implemented method for a network attached storage (NAS) device to migrate from a first operational state comprising first system settings to a second operational state comprising second system settings, the method comprising:
 receiving over a network interface coupled to a network, a communication identifying an externally accessible storage device that is a) accessible from the network and that b) stores a NAS configuration image that was created by an other NAS device and that comprises the second system settings;
 accessing, over the network, the NAS configuration image stored on the identified externally accessible storage device;
 determining that the NAS configuration image is compatible with the NAS device;
 receiving, over the network, a copy of the NAS configuration image;
 comparing the second system settings with the first system settings to identify compatible system settings; and
 modifying the first system settings based on the compatible system settings.

18. The computer-implemented method of claim 17, wherein the externally accessible storage device is at least one of:
 a remotely server accessible over a network;
 a cloud computing environment;
 a network share;
 a remote NAS device accessible over a network; and
 a secondary storage device accessible from the network.

19. The computer-implemented method of claim 17, wherein the first system settings are one of factory settings of a new NAS device and settings of a default operational state.

20. The computer-implemented method of claim 17, wherein the second system settings comprises NAS settings defining a functionality of the second NAS device and user settings.

21. The computer-implemented method of claim 20, wherein the user settings comprises user access credentials and user application settings.

22. The computer-implemented method of claim 17, wherein the NAS configuration image further comprises user directories and files and wherein the computer-implemented method further comprises copying the user directories and files from the received copy of the NAS configuration image to the NAS device.

23. The computer-implemented method of claim 17, wherein the externally accessible storage device stores a plurality of versions of the NAS configuration image and wherein the method further comprises identifying and selecting one of the plurality of versions of the NAS configuration images and wherein receiving copy of the NAS configuration comprises receiving, over the network, the selected version of the NAS configuration image.

* * * * *